United States Patent [19]

Garrison

[11] 4,086,788

[45] May 2, 1978

[54] DRIVE HAVING A PLURALITY OF THRUST BEARINGS

[75] Inventor: Marion A. Garrison, Denver, Colo.

[73] Assignee: Empire Oil Tool Company, Denver, Colo.

[21] Appl. No.: 775,828

[22] Filed: Mar. 9, 1977

[51] Int. Cl.² .............................................. F16D 3/06
[52] U.S. Cl. ........................................................ 64/23
[58] Field of Search ................ 64/23, 1 R; 92/DIG. 3

[56] References Cited

U.S. PATENT DOCUMENTS

| | | | |
|---|---|---|---|
| 2,756,022 | 7/1956 | Sturgeon | 64/23 |
| 3,966,369 | 6/1976 | Garrison | 418/149 |
| 3,986,370 | 10/1976 | Garrison | 64/23 |

Primary Examiner—Edgar W. Geoghegan

[57] ABSTRACT

A drive having a plurality of thrust bearings includes a rotatable shaft located in a housing with a space therebetween and a plurality of spaced apart thrust bearings in said space. Two members axially movable with respect to one another are provided in the space between each pair of thrust bearings. A circumferential chamber is provided between the members with a resilient ring in the chamber. The volume of the ring is less than that of the chamber when little or no load is present. Under load the ring is deformed as the volume of the chamber is decreased due to axial movement of the members with respect to one another so that better distribution of the load between bearings occurs.

5 Claims, 3 Drawing Figures

DRIVE HAVING A PLURALITY OF THRUST BEARINGS

This invention relates to a drive having a plurality of thrust bearings and more particularly to a deep oil well drill such as shown in my U.S. Pat. Nos. 3,966,369 and 3,986,370. In deep oil well drilling high axial loads, such as 80,000 lbs., are common. As a result it is often necessary to provide a plurality of thrust bearings to sustain the load. I have found that the load in conventional drives is distributed very unevenly between the bearings and as a result one of the bearings sometimes becomes overloaded with resultant damage or shortened life.

It is therefore an object of my invention to provide a drive in which the total thrust load is more evenly divided among a plurality of thrust bearings.

Figure 1A:
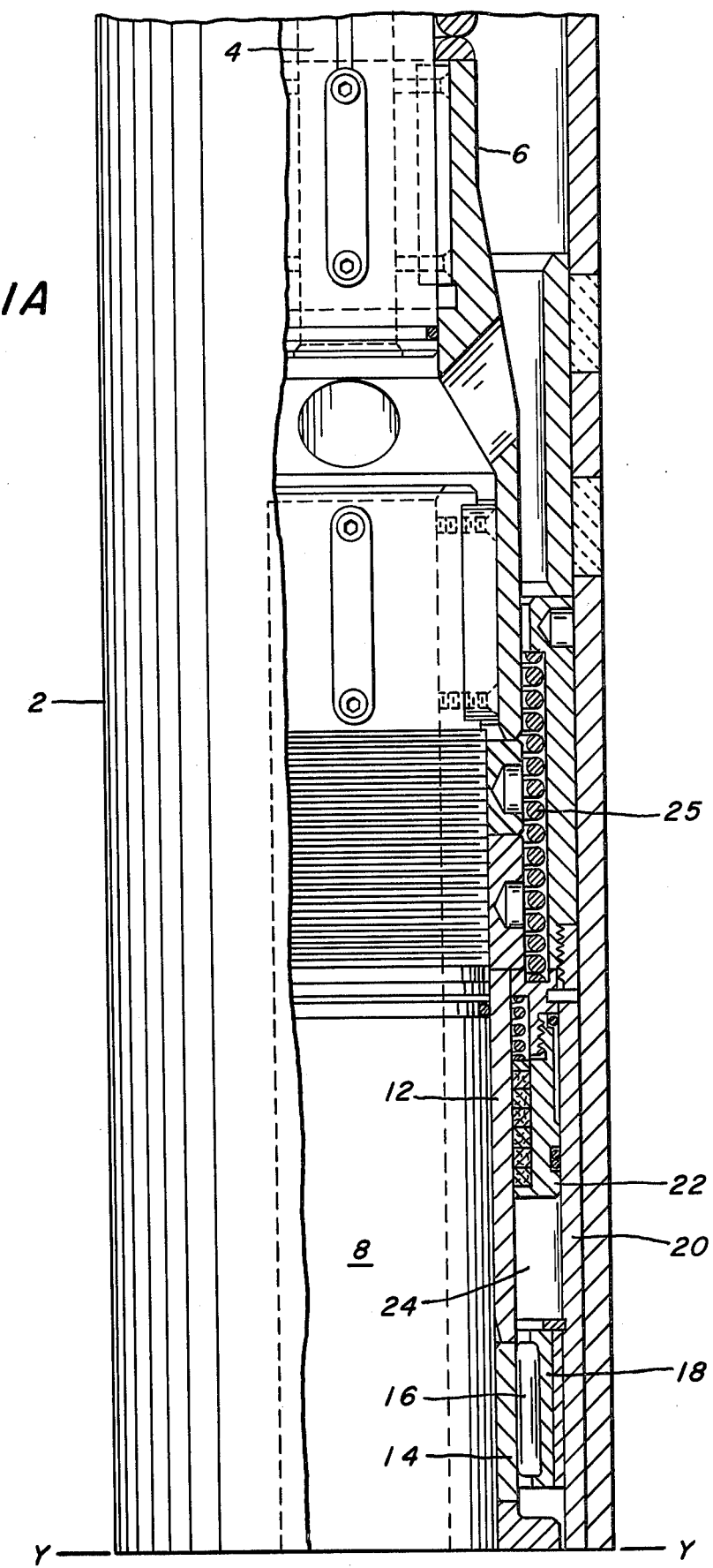
Figure 1B:
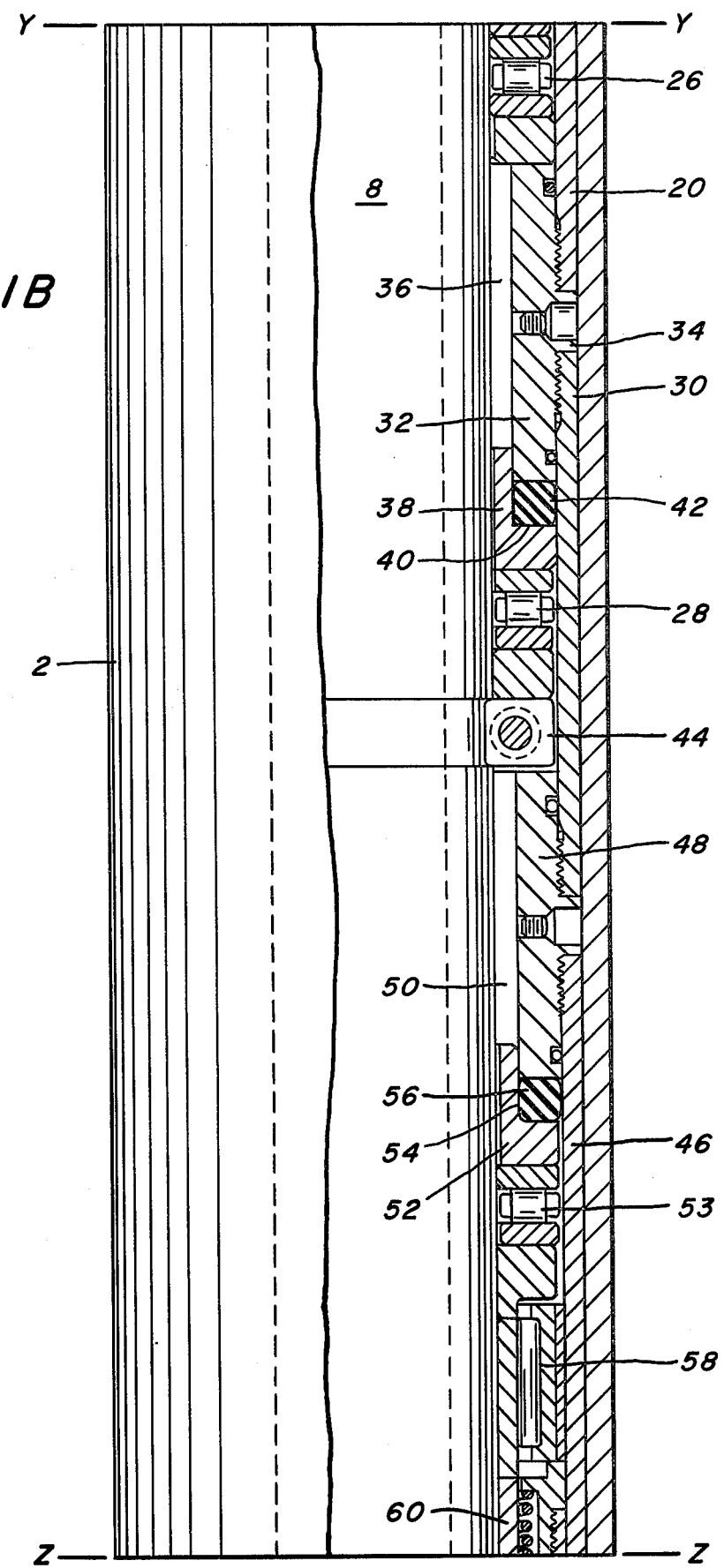
Figure 1C:
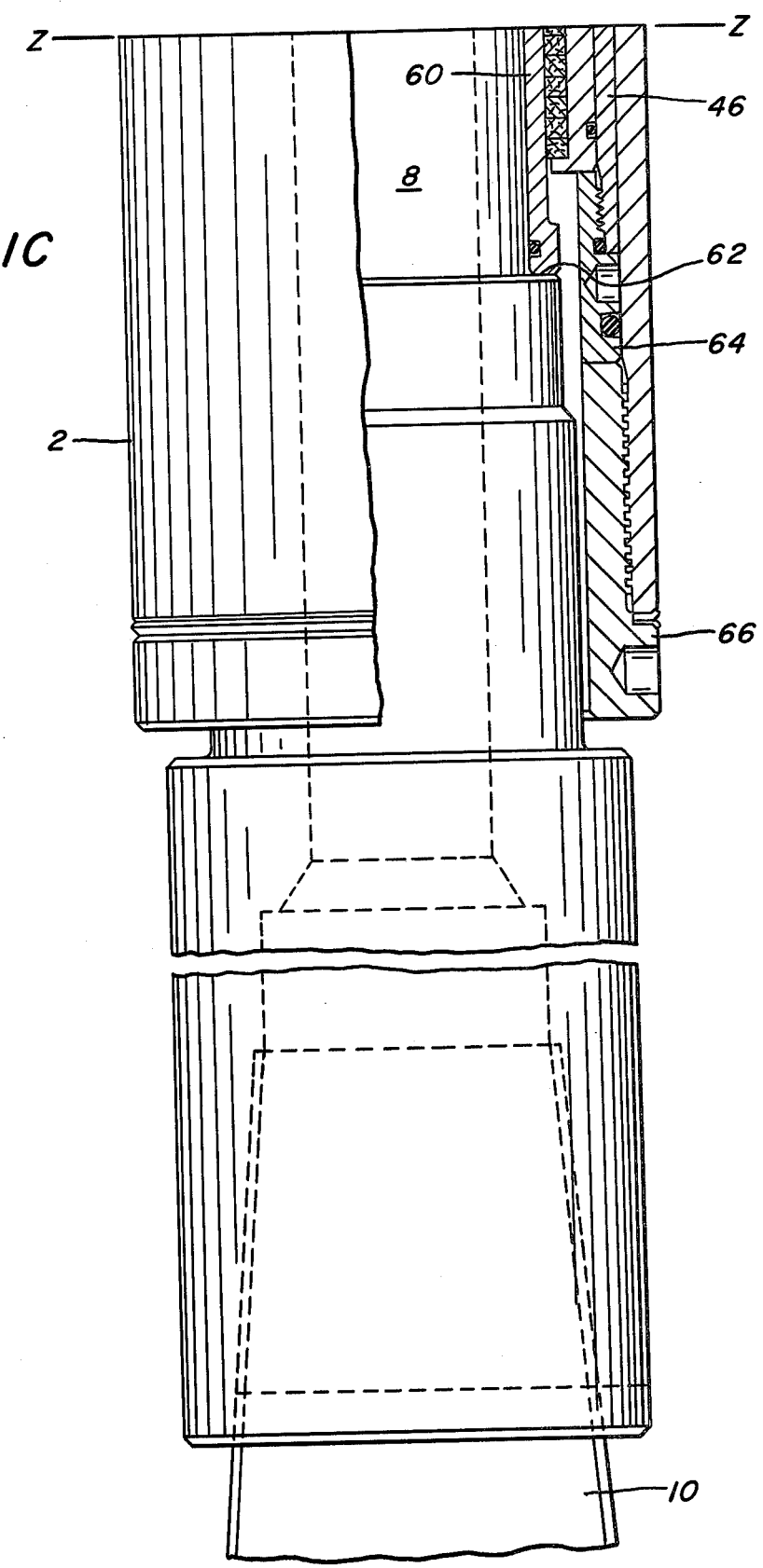

This and other objects will be more apparent after referring to the following specification and attached drawings in which FIGS. 1A, 1B and 1C when connected on lines Y—Y and Z—Z disclose the drive of my invention in elevation with parts broken away and shown in section.

Referring more particularly to the drawings, reference numeral 2 indicates the outer housing of a motor, preferably a deep oil well motor such as shown in my above mentioned U.S. Pat. Nos. 3,966,369 and 3,986,370. The motor (not shown in detail) has a shaft 4, the lower end of which is connected by a coupling 6 to a rotatable drill shaft 8 having a bit 10 secured to its lower end. A sleeve 12 is secured to the shaft 8 adjacent its upper end for rotation therewith with its lower end abutting the upper end of inner bearing race 14 which also rotates with shaft 8. Rollers of bearing 16 are arranged between inner race 14 and outer race 18 in the usual manner. A bushing 20 attached to the inside of housing 2 surrounds outer race 18. A piston 22 is provided in the space between sleeve 12 and bushing 20 with a grease cavity 24 between the bearing 16 and the lower end of piston 22. A spring 25 urges piston 22 toward bearing 16. Axially spaced apart first and second thrust bearings 26 and 28 surround and rotate with shaft 8 below bearing 16. A second bushing 30 is secured to the inside of housing 2 in spaced apart relationship with bushing 20. A sleeve 32 threaded into bushings 20 and 30 has a flange 34 extending into the space between bushings 20 and 30 and provides a grease chamber 36. An axially movable L-shaped member 38 extends into chamber 36 and provides a circumferential chamber 40 for receiving a resilient but substantially non-compressible thrust ring 42 having a volume less than the volume of chamber 40 when the drill is substantially unloaded. For example, the corners of ring 42 may be rounded as shown. One suitable material is fiberglass loaded silicone rubber having 80 durometer hardness. Under load the member 38 will move upward, thus decreasing the volume of chamber 40.

A split collar 44 surrounds shaft 8 below thrust bearing 28. A third bushing 46 is secured to the inside of housing 2 in spaced apart relationship with bushing 30. A sleeve 48, similar to sleeve 32, is threaded into bushings 30 and 46 and provides a grease chamber 50. A second member 52, similar to member 38 abuts against a third thrust bearing 53 and with sleeve 48 provides a chamber 54 having a ring 56 therein similar to chamber 40 and ring 42, respectively.

A roller bearing 58 of the same construction as bearing 16 is mounted on shaft 8 below thrust bearing 54. A sleeve 60 is secured to shaft 8 between bearing 58 and shoulder 62 on shaft 8. A bushing 64 is threaded to the lower end of bushing 46 with its lower end abutting a bushing 66 threaded into the lower end of housing 2. Packing is preferably provided as shown in the drawings.

It will be seen that a resilient ring is provided between each pair of thrust bearings and it will be understood that more than three, but no less than two, thrust bearings may be used.

In operation, with little or no load on the drill, the parts will be as shown in the drawings. When load is applied the L-shaped members 38 and 52 will move upwardly with respect to sleeves 32 and 48, respectively until the volume of chambers 40 and 54 is reduced. These reductions may or may not be equal depending upon various factors including accuracy in machining. While absolutely even distribution of the load between thrust bearings may not often occur, a reasonable distribution of the total axial load is achieved, thus protecting the thrust bearings from overload. It will be noted that thrust bearings are normally used having a rated capacity substantially greater than the total axial load divided by the number of thrust bearings so that an exactly equal distribution of load is not required.

While one embodiment has been shown and described, it will be readily apparent to those skilled in the art that various adaptations and modifications may be made within the scope of the invention.

I claim:

1. In a drive including a rotable shaft subjected to an axial load, a housing surrounding said shaft in spaced relationship therewith to provide a space therebetween, a pair of axially spaced thrust bearings in said space, a pair of members in said space between said thrust bearings having a circumferential chamber therebetween, said pair of members being axially movable with respect to one another to vary the size of said chamber, and a resilient but relatively non-compressible ring in said chamber having a volume less than the volume of said chamber when there is relatively little axial load on said shaft, said members being axially movable with respect to one another under load to decrease the volume of said chamber and deform said resilient ring.

2. The combination of claim 1 including a third thrust bearing in said space axially spaced from the other thrust bearings, and having a circumferential chamber therebetween, a pair of members in said space between said third thrust bearing and the thrust bearing adjacent thereto, said pair of members being axially movable with respect to one another to vary the size of said chamber, and a resilient but relatively non-compressible ring in said chamber having a volume less than the volume of said chamber when there is relatively little axial load on said shaft, said members being axially movable with respect to one another under load to decrease the volume of said chamber and deform said resilient ring.

3. The combination of claim 2 in which each of said pair of members includes a member fixed with respect to said housing and having an inner diameter greater than the shaft diameter to provide an annular space, and an L-shaped member axially movable with respect to said housing, said L-shaped member having an axial leg received in said annular space and a radial leg extending outwardly to provide said circumferential chamber.

4. The combination of claim 1 in which said pair of members includes a member fixed with respect to said housing and having an inner diameter greater than the shaft diameter to provide an annular space, and an L-shaped member axially movable with respect to said housing, said L-shaped member having an axial leg received in said annular space and a radial leg extending outwardly to provide said circumferential chamber.

5. The combination of claim 4 in which said housing is a motor housing for a deep oil well drill, and said shaft is a drill shaft having a drill bit at its lower end.

* * * * *